United States Patent [19]

Huessy

[11] 3,857,977

[45] Dec. 31, 1974

[54] FOOD FLAVOR PELLETS WITH WHEAT FLOUR, SOY FLOUR AND BUTTERMILK BASE

[75] Inventor: Eric G. Huessy, Eden Prairie, Minn.

[73] Assignee: Peavey Company, Minneapolis, Minn.

[22] Filed: May 29, 1973

[21] Appl. No.: 364,914

[52] U.S. Cl.............. 426/189, 426/199, 426/221, 426/363, 426/377
[51] Int. Cl............................................. A23l 1/26
[58] Field of Search ........... 426/147, 189, 199, 202, 426/213, 358, 359, 363, 378, 517

[56] References Cited
UNITED STATES PATENTS
2,357,585  9/1944  Galvin et al. ...................... 426/106
2,468,744  5/1949  Gavin................................ 426/128
3,185,574  5/1965  Gabby et al. ...................... 426/152

Primary Examiner—A. Louis Monacell
Assistant Examiner—R. A. Yoncoskie

[57] ABSTRACT

A method and formulation for preparing edible food flavoring cubes or pellets such as non-melting imitation cheeses for incorporation in dry food systems wherein the edible flavoring cubes or pellets have a wheat flour, soy flour, and buttermilk base. The method includes the preparation of a homogeneous mixture of the selected formulation, and thereafter passing the mixture through a product agitating zone which holds the material at elevated temperature and pressure over a rather substantial holding or retention time. The material is thereafter extruded from the agitating zone in the form of a continuously extruded product which is cut at intervals into the desired produce size and length.

3 Claims, No Drawings

FOOD FLAVOR PELLETS WITH WHEAT FLOUR, SOY FLOUR AND BUTTERMILK BASE

BACKGROUND OF THE INVENTION

The present invention relates generally to a method for preparing edible food flavoring cubes or pellets, and more particularly to a method for preparing such cubes or pellets having a formulation high in wheat flour, soy flour, and buttermilk solids. Food flavoring products of this type have traditionally been prepared by techniques utilizing relatively high water contents in the formulations. The present concept provides for a method of preparing such edible food flavoring cubes or pellets utilizing only a modest amount of water or moisture in the formulation, so as to permit the materials to be incorporated into dry food systems like soup, salads, casserole mixes and the like. The product is essentially an imitation cheese which does not melt under normal cooking procedures, and have been found to retain configuration and flavor after even more than 20 minutes exposure to boiling water. The technique provides homogeneous mixtures of components providing products having enhanced flavoring characteristics. During processing, the exposure of the formulation to elevated temperatures is held to a practical minimum, thereby preserving the character and quality of the flavoring ingredient.

In the past, it has been normal practice to utilize cooking vessels for the preparation of formulations for edible food flavoring products. These vessels will normally retain the charge of material at a relatively high temperature over an extended period of time, thereby causing deterioration of certain of the flavoring ingredients. In addition to deterioration, certain flavoring ingredients may become fugitive in the formulation, and thus inconsistencies in flavor, from batch to batch, may reasonably be expected to occur. The concept of the present invention provides a technique for preparing such formulations with a high degree of product consistency, quality, and character.

In addition to the non-melting products, meltable products may be formulated as well. The meltable material provides a greater degree of versatility of utility for the finished product.

SUMMARY OF THE INVENTION

The edible food flavoring cubes or pellets prepared in accordance with the present invention find their primary utility in combination with dry food systems or mixes, such as soup mixes, salads, omelet and casserole mixes, and the like.

As indicated, the compositions of the present invention are based upon wheat flour, soy flour, and buttermilk solids. Whey may also be incorporated as a flavoring ingredient, and vegetable oil is presently used to provide the fatty component necessary for texturizing the product. Vegetable oil also provides a mechanical advantage in lubrication of the extruder during processing.

The compositions of the present invention also contain a quantity of hydrocolloid, preferably Xanthan gum. Xanthan gum is a high molecular weight linear polysaccharide which functions as a hydrophilic colloid to stabilize the high sugar content formulations. Essentially, Xanthan gum is classified as a carbohydrate, being a complex polysaccharide with a molecular weight of more than one million. The linear structure includes a beta-linked backbone containing d-glucose, d-mannose and d-glucuronic acid with 1 d-mannose side-chain unit for every 8 sugar residues and 1 d-glucose side-chain residue for every 16 sugar residues. The polysaccharide making up Xanthan gum is partially acetylated and contains pyruvic acid attached to the glucose side-chain residue. The molar ratio of d-glucose to d-mannose to d-glucuronic acid of Xanthan gum is 2.8:3.0:2.0 Xanthan gum is a preferred hydrocolloid because of its tolerance to relatively wide ranges of pH encountered in the systems.

The incorporation of Xanthan gum in the dry formulation further assists in the later extrusion operation, the Xanthan gum functioning as a lubricating agent for lubricating the mechanism while in combination with water. Xanthan gum also retains water with the adverse conditions of elevated temperatures encountered in the processing. It has been found that modified hydrocolloids may be employed, such as alginates, carboxy-methyl-cellulose, or certain other natural occurring gums. While these substitute hydrocolloids may find some limited utility in the system, it has been ascertained that Xanthan gum is specifically preferred.

The wheat flour component is utilized primarily as a bulking agent, and also provides for limited gelatinization. The soy flour component, in addition to performing as a bulking agent, has been found to provide texturing for the product. The dried buttermilk solids utilized in the mixture provide both flavor and emulsification properties to the product. With this variety of components present in the product, it is possible to extrude the homogeneously mixed material into cubes or pellets.

The edible food flavoring cubes or pellets prepared in accordance with the present invention have a relatively long shelf life and normally will not deteriorate or modify their characteristics and become soft, sticky, or runny under normal modern packaging techniques. The food flavoring cubes or pellets have good shelf life and retain their characteristic texture and flavor over extended periods of time, and will not deteriorate under normal environmental conditions.

Essentially, in accordance with the present invention, a formulation is initially prepared having a relatively high wheat and soy flour content, such as a content in excess of about 30 percent. The formulations are prepared, mixed homogeneously, and maintained with a low or modest water content. Following formulation, the mixture is passed through a product agitating zone where it is held under conditions of elevated temperature and pressure until it is ultimately extruded from the agitating chamber and cut into individual cubes or pellets to form a product.

Therefore, it is a primary object of the present invention to provide an improved technique for the preparation of edible food flavoring cubes or pellets, with these bodies having desirable, predetermined, and repeatable characteristics of flavoring and texture.

It is a further object of the present invention to provide an improved technique for the preparation of edible food flavoring cubes or pellets from formulations having a high wheat and soy flour content and a low moisture content, wherein the formulation from which the product is prepared is exposed to conditions of high temperature and high pressure for a controlable period of time, with characteristics of flavor and texture being retained with a significant high degree of uniformity.

It is a further object of the present invention to provide an improved technique for the preparation of edible food flavoring cubes or pellets having high starch content and low moixture content, and wherein the formulation is subjected to an agitation operation under conditions of elevated temperature and pressure, and is thereafter extruded, and cut to a selected product size.

It is yet a further object of the present invention to provide a method of preparing edible food flavoring cubes or pellets from a formulation which contains a quantity of Xanthan gum for controlling the moisture retention in the product, while being subjected to exposure to conditions of elevated temperature and pressure.

It is yet a further object of the present invention to provide an improved formulation and method for preparing edible food flavoring cubes or pellets from a formulation based upon wheat and soy flour and buttermilk solids, and wherein the finished product has a texture resembling that of natural cheese.

It is still a further object of the present invention to provide an improved technique and formulation for the preparation of edible food flavoring cubes or pellets which are adapted for use as artificial cheese flavoring.

Other and further objects of the present invention will become apparent to those skilled in the art upon a study of the following specification and appended claims.

DESCRIPTION OF THE PREFERRED EMBODIMENT

For conducting the various operations pursuant to the present invention, a formulation having the following composition was prepared:

EXAMPLE 1

| Ingredient | Percentage |
| --- | --- |
| Wheat flour | 27.08 |
| Hydrogenated Vegetable Oils | 18.06 |
| Dried Buttermilk | 18.06 |
| Corn Syrup solids | 9.03 |
| Whey | 9.03 |
| Soy Flour | 4.51 |
| Salt | 3.97 |
| Water | 3.61 |
| Glycerin | 1.99 |
| Flavoring | 1.35 |
| Lactic Acid | 1.19 |
| Garlic Powder | 1.08 |
| Artificial Flavor | 0.90 |
| Xanthan Gum | 0.10 |
| Artificial Flavoring | 0.03 |
| Artificial Coloring | 0.01 |

In order to prepare the formulation for processing, the dry bulk ingredients are thoroughly mixed together so as to provide a homogeneous mass. The fat phase is then added and the components again thoroughly mixed until homogeneous. The water phase together with the flavor and color added thereto is then added to the mix and the total mass is then continued to be mixed until homogeneous. Conventional mixing chambers and vessels may be employed for this treatment.

The semi-heavy dry mix is then placed into the auger chamber of an extruder, with the die being provided with a cut-off blade. The auger chamber is preferably heated to a temperature of between about 180° and 200° F., however if higher temperature ranges are utilized, care must be taken to control the water content of the finished product, since a certain quantity may be flashed off at the die.

The viscosity of the product while in the extruder chamber assures elevated pressures within the auger chamber such as in the range of about 500 psi.

A heated auger may be employed in order to achieve the desired temperature range during mixing, heated chambers of this type being, of course, commercially available. Steam is normally employed as the heating medium.

If desired, a conventional tumbler can be utilized to form an agglomeration of the raw material to form the cube or pellet. Such agglomeration tumblers are also, of course, commercially available.

After the individual cubes or pellets are cut from the extruder die, they are permitted to cool and are available for use.

In the composition of Example 1, the function of the individual ingredients has been partially described hereinabove, with the wheat flour being a bulking and gelatinization agent, and with the soy flour being a texturing and bulking agent. The dried buttermilk is the flavor and emulsifier. The hydrogenated vegetable oil is the fatty ingredient needed for texturizing, and to give the material a "cheese-like" consistency. The vegetable oil also functions as a lubrication medium. Whey, when present, is a flavoring ingredient with functions related to those of the dried buttermilk. Salt provides a conventional flavoring for the material, and glycerin functions as a humectant.

The flavoring, lactic acid, garlic powder, and artificial flavor are all utilized for flavoring purposes. The flavoring employed is natural cheddar cheese solids, with the artificial flavor indicated being preferably an oil base imitation cheddar cheese flavor. The ingredient identified as "artificial flavoring" is imitation smoke flavor, while artificial coloring is any conventional vegetable coloring.

The Xanthan gum is a humectant and water-retaining component and its function has been described in some detail hereinabove.

The product can be utilized for its textural characteristics in either a wet or dry medium. The extruded product contains a substantial quantity of modified starch with a high fat content. Furthermore, the material substantially retains its configuration and flavor after extended exposure to cooking environments, including exposure to boiling water.

The composition and formulation of Example 1 provides a smokey cheddar nugget on a dry basis.

A blue cheese nugget has been prepared in accordance with the following example:

EXAMPLE 2

| Ingredient | Percentage |
| --- | --- |
| Wheat Flour | 26.85 |
| Hydrogenated Vegetable Oils | 17.90 |
| Dried Buttermilk | 17.90 |
| Corn Syrup Solids | 8.95 |
| Whey | 8.95 |
| Soy Flour | 4.48 |
| Water | 3.97 |
| Salt | 3.94 |
| Artificial Flavorings | 2.44 |
| Glycerin | 1.97 |
| Lactic Acid | 1.25 |
| Onion Powder | 0.49 |
| Sodium Citrate | 0.39 |

-Continued

EXAMPLE 2

| Ingredient | Percentage |
|---|---|
| Bran | 0.39 |
| Xanthan Gum | 0.10 |
| Coloring | 0.01 |

The individual components of the formulation are added together in the manner described in connection with Example 1. Following mixing, they are placed into the auger chamber of an extruder and treated in accordance with the details given in connection with Example 1.

An imitation blue cheese was prepared in the form of flavor pellets according to the following formulation:

EXAMPLE 3

| Ingredient | Percentage |
|---|---|
| Wheat Flour | 27.14 |
| Shortening | 18.09 |
| Dried Buttermilk | 18.09 |
| Corn Syrup Solids | 9.05 |
| Whey | 9.05 |
| Soy Flour | 4.52 |
| Water | 4.34 |
| Salt | 3.98 |
| Artificial Flavor | 1.99 |
| Glycerin | 1.99 |
| Lactic Acid | 1.27 |
| Sodium Citrate | 0.40 |
| Xanthan Gum | 0.10 |

These individual components were treated in accordance with the details set forth in connection with Example 1, including the mixing procedure as well as the extrusion procedure.

An imitation cheddar cheese was prepared in the form of flavor pellets according to the following formulation:

EXAMPLE 4

| Ingredient | Percentage |
|---|---|
| Wheat Flour | 27.65 |
| Shortening | 18.44 |
| Dried Buttermilk | 18.44 |
| Corn Syrup Solids | 9.22 |
| Whey | 9.22 |
| Soy Flour | 4.61 |
| Salt | 4.06 |
| Water | 3.32 |
| Glycerin | 2.03 |
| Lactic Acid | 1.22 |
| Flavoring | 1.01 |
| Artificial Flavor | 0.68 |
| Xanthan Gum | 0.10 |
| Food Color | 0.01 |

These individual components were treated in accordance with the details set forth in connection with Example 1, including the mixing procedure as well as the extrusion procedure.

An imitation blue cheese for use in wet systems was prepared according to the following formulation:

EXAMPLE 5

| Ingredient | Percentage |
|---|---|
| Wheat flour | 25.70 |
| Shortening (unhydrogenated oil) | 17.13 |
| Dried Buttermilk | 17.13 |
| Corn Syrup Solids | 8.57 |
| Soy Flour | 8.57 |
| Whey | 8.57 |
| Water | 6.43 |
| Salt | 3.97 |
| Flavoring | 2.13 |
| Lactic Acid | 1.32 |
| Sodium Citrate | 0.38 |
| Locust Bean Gum | 0.06 |
| Xanthan Gum | 0.06 |

These individual components were treated in accordance with the details set forth in connection with Example 1, including the mixing procedure as well as the extrusion procedure.

parmesan Parmesan for wet food systems were prepared according to the following formulation:

EXAMPLE 6

| Ingredient | Percentage |
|---|---|
| Parmesan Cheese (natural) | 16.77 |
| Hydrogenated Vegetable Oil | 15.48 |
| Wheat Flour | 15.48 |
| Dried Buttermilk | 15.48 |
| Soy Flour | 10.32 |
| Hydro. Plant Protein | 5.16 |
| Salt | 5.16 |
| Corn Syrup Solids | 5.16 |
| Whey | 5.16 |
| Water | 3.41 |
| Artificial Flavorings | 1.48 |
| Lactic Acid | 0.57 |
| Sodium Citrate | 0.23 |
| Monosodium Glutamate | 0.11 |
| Xanthan Gum | 0.03 |
| Resoleum Garlic | 0.01 |

These individual components were treated in accordance with the details set forth in connection with Example 1, including the mixing procedure as well as the extrusion procedure.

GENERAL CONSIDERATIONS

For general considerations, the following range of components is deemed preferable for preparing the products of the present invention:

TABLE I

| Ingredient | Percentage Range |
|---|---|
| Wheat Flour | 25 – 35 |
| Vegetable Oil | 11 – 18 (preferably 17–18) |
| Dried Buttermilk | 17 – 18 |
| Corn Syrup Solids | 8 – 10 |
| Whey | 8 – 9 |
| Soy flour | 4 – 8 |
| Salt | 3 – 4 |
| Glycerin | About 2 |
| Xanthan Gum | About 0.1 |
| Flavoring, lactic acid, garlic or onion flavoring | As required for balance |

This range of components in the formulation will provide a product having the desired texture and flavoring for a cheese substitute.

If desired, it is possible to provide additional texturing agents such as, for example, vegetable protein or tow, this contributing to the texture of the overall finished product.

The various formulations as set forth are, of course, exemplary and provide a basis for those various modifications and formulations which may be utilized while practicing the features of the present invention.

I claim:

1. An edible food flavoring pellet for incorporation in dry food systems which comprises:
   a. a homogeneous mixture having a wheat flour, soy flour, and dry buttermilk base with the following formulation:

| Ingredient | Percentage Range |
|---|---|
| Wheat Flour | 25 – 35 |
| Vegetable Oil | 11 – 18 |
| Dried Buttermilk | 17 – 18 |
| Corn Syrup Solids | 8 – 10 |
| Whey | 8 – 9 |
| Soy Flour | 4 – 8 |
| Salt | 3 – 4 |
| Glycerin | about 2 |
| Xanthan Gum | about 0.1 |
| Flavoring, lactic acid, garlic or onion flavoring | as required for balance |

2. The edible food flavoring pellet as defined in claim 1 being particularly characterized in that said mixture has the following formulation:

| Ingredient | Percentage |
|---|---|
| Wheat Flour | 27.08 |
| Hydrogenated Vegetable Oils | 18.06 |
| Dried Buttermilk | 18.06 |
| Corn Syrup Solids | 9.03 |
| Whey | 9.03 |
| Soy Flour | 4.51 |
| Salt | 3.97 |
| Water | 3.61 |
| Glycerin | 1.99 |
| Flavoring | 1.35 |
| Lactic Acid | 1.19 |
| Garlic Powder | 1.08 |
| Artificial Flavor | 0.90 |
| Xanthan Gum | 0.10 |
| Artificial Flavoring | 0.03 |
| Artificial Coloring | 0.01 |

3. The method of preparing edible food flavoring pellets for incorporation in dry food systems which comprises:
   a. preparing a homogeneous mixture with the following formulation:

| Ingredient | Percentage Range |
|---|---|
| Wheat Flour | 25 – 35 |
| Vegetable Oil | 11 – 18 |
| Dried Buttermilk | 17 – 18 |
| Corn Syrup Solids | 8 – 10 |
| Whey | 8 – 9 |
| Soy Flour | 4 – 8 |
| Salt | 3 – 4 |
| Glycerin | about 2 |
| Xanthan Gum | about 0.1 |
| Flavoring, lactic acid, garlic or onion flavoring | as required for balance | b. passing said extrudate through an extruder at elevated pressure, and at a temperature of between 180° F. – 200° F.; and
   c. separating said formulation into integral pellets.

* * * * *